United States Patent [19]
Van Mill

[11] Patent Number: 5,590,721
[45] Date of Patent: Jan. 7, 1997

[54] CONSERVATION TILLAGE TOOL

[75] Inventor: Michael D. Van Mill, Shell Rock, Iowa

[73] Assignee: Unverferth Manufacturing Co., Inc., Kalida, Ohio

[21] Appl. No.: 594,599

[22] Filed: Jan. 31, 1996

Related U.S. Application Data

[63] Continuation of Ser. No. 306,753, Sep. 15, 1994, abandoned.

[51] Int. Cl.$^6$ ............................. A01B 63/32; A01B 35/18
[52] U.S. Cl. ...................... 172/138; 172/148; 172/178; 172/149; 172/319; 172/467; 172/462; 172/488
[58] Field of Search .................................. 172/473, 138, 172/148, 319, 140, 145, 149, 414, 458, 462, 467, 468, 469, 470, 488, 489, 178

[56] References Cited

U.S. PATENT DOCUMENTS

| | | | |
|---|---|---|---|
| 2,076,673 | 4/1937 | Ropen | 172/138 |
| 2,505,280 | 9/1950 | Ellinghuysen | 172/138 X |
| 2,717,479 | 9/1955 | Scheidenhelm et al. | |
| 2,780,158 | 2/1957 | Pursche | |
| 3,225,835 | 12/1965 | Steinbach | 172/138 |
| 4,227,581 | 10/1980 | Klotzbach | |
| 4,403,662 | 9/1983 | Dietrich | |
| 4,444,271 | 4/1984 | Dietrich | |
| 4,450,917 | 5/1984 | Hake | |
| 4,454,920 | 6/1984 | Dietrich | |
| 4,492,272 | 1/1985 | Jensen | |
| 4,535,849 | 8/1985 | Dietrich | |
| 4,542,793 | 9/1985 | Dietrich | |
| 4,615,396 | 10/1986 | Arnold | 172/138 |
| 4,712,622 | 12/1987 | Birkenbach | |
| 5,156,216 | 10/1992 | Van Mill | |
| 5,161,622 | 11/1992 | Godbersen | 172/170 |

FOREIGN PATENT DOCUMENTS

| | | | |
|---|---|---|---|
| 280048 | 8/1988 | European Pat. Off. | 172/145 |
| 344298 | 11/1936 | Italy | |
| 519154 | 7/1976 | U.S.S.R. | |
| 1393328 | 5/1988 | U.S.S.R. | |
| 2062431 | 5/1981 | United Kingdom | |

OTHER PUBLICATIONS

Copy—30 pages of Operator's Manual entitled Brent CPC Deep Tillage Tool by Unverferth.
4 pages—(copy) of brochure entitled Kverneland Seed Bedder.
4 pages—(copy) of brochure entitled "A new better way . . . aggressive one-pass tillage on the go DMI turbo-tiger" by DMI, Inc.
20 pages—(copy) of brochure entitled "Grounds for Owning a Krause" by Krause Corporation.

Primary Examiner—Terry Lee Melius
Assistant Examiner—Robert Pezzuto
Attorney, Agent, or Firm—Rothwell, Figg, Ernst & Kurz

[57] ABSTRACT

A conservation tillage tool, including a main frame and a rear frame pivotally mounted on the main frame disposed to support a number of soil working implements in sequence. The main frame is supported by ground wheels attached to the rear section of the main frame. The wheels are movable with respect to the main frame to move the latter between a raised transport position and a number of lowered working positions. A tongue and hitch unit connect the main frame to a prime mover, and a leveling mechanism operably interconnects the main frame, ground wheels and tongue for maintaining the main frame level at any of its positions. A spring-cushioned linkage operably interconnects one of the implements at the front of the main frame with one of the implements mounted on the rear frame for simultaneously raising and lowering those two implements between transport and working positions. A suspension linkage operates in concert with the spring-cushioned linkage for permitting the rear implement to raise according to terrain independent of the front implement.

8 Claims, 6 Drawing Sheets

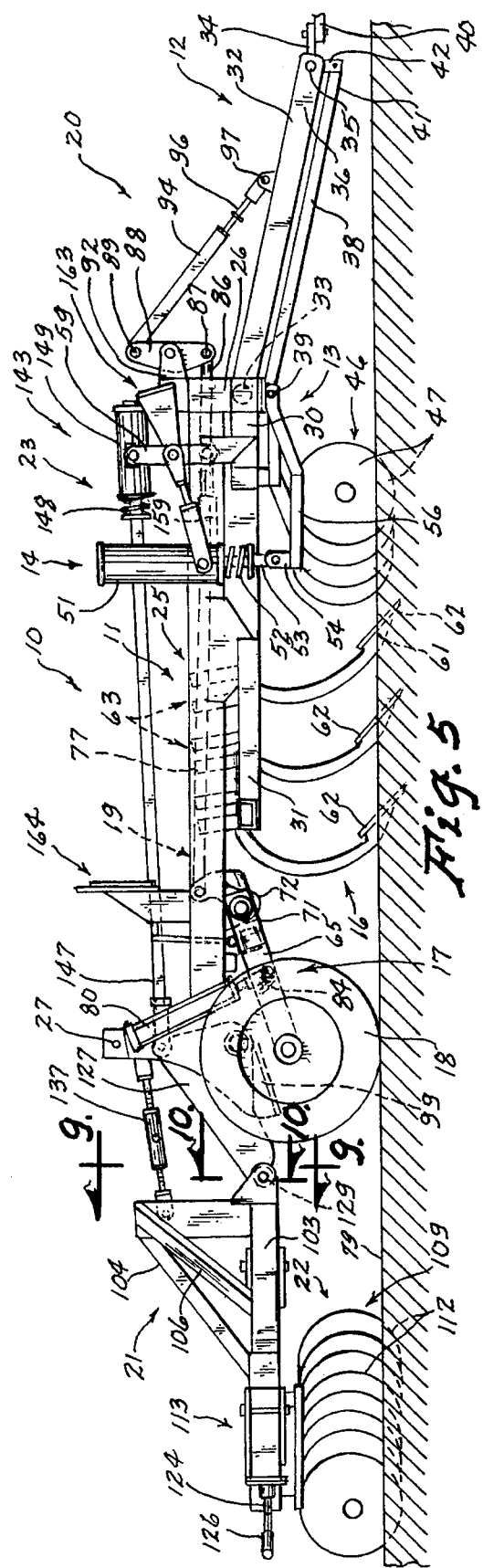
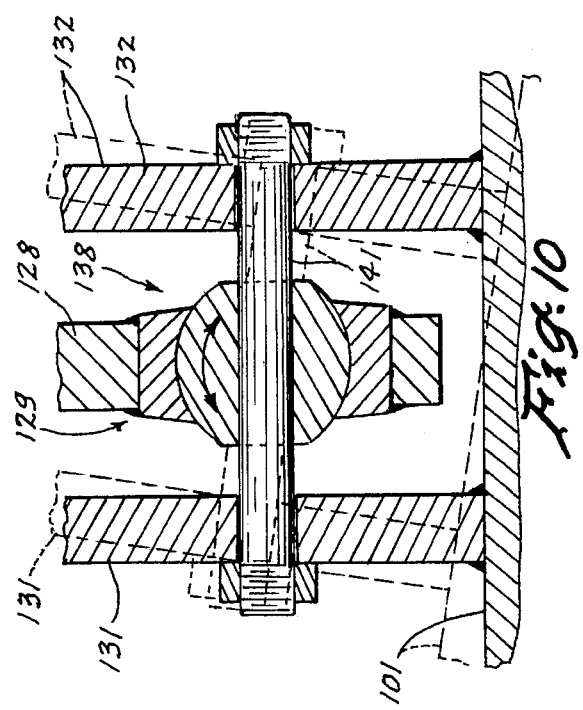
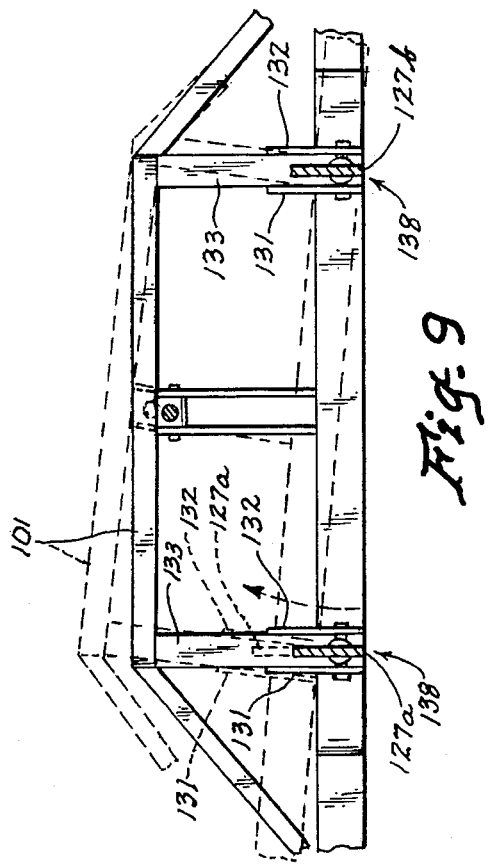

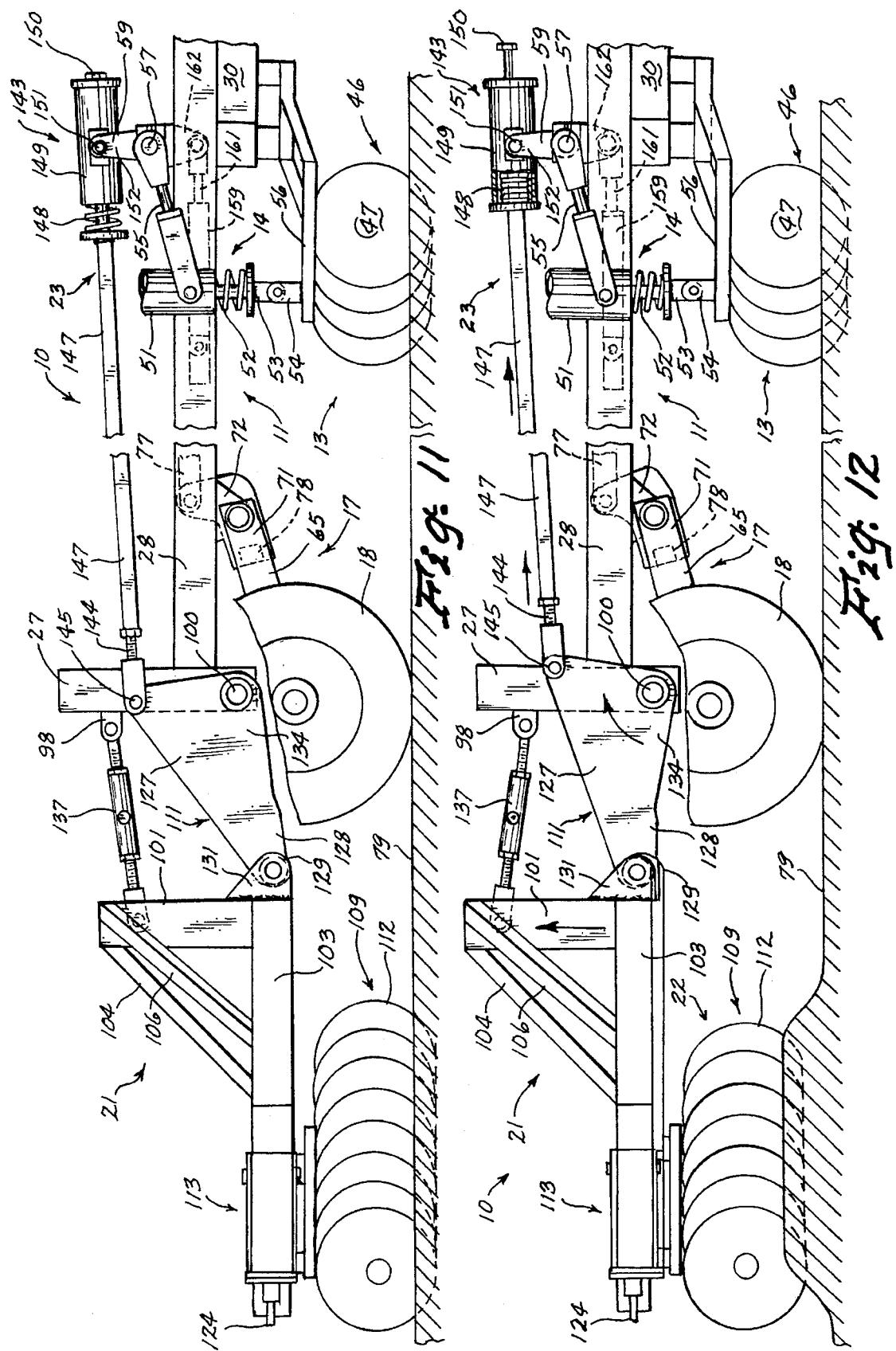

CONSERVATION TILLAGE TOOL

This is a continuation of application Ser. No. 08/306,753, filed Sep. 15, 1994, now abandoned.

TECHNICAL FIELD

This invention relates to conversation tillage implements, and more particularly to a tillage implement or tool having a number of soil working implements mounted in sequence, and operable in sequence to accommodate varying soil terrain.

BACKGROUND ART

The trend toward conservation practices in agriculture has led to the utilization of no-till and conservation tillage tools. Arranging a number of different soil working implements in sequence on a single frame is a popular expedient since the goal is always to do more with less input. Such an arrangement is shown in U.S. Pat. No. 5,156,216 issued Oct. 20, 1992 to Michael D. Van Mill.

Those concerned recognize the need for an improved conservation tillage implement.

DISCLOSURE OF THE INVENTION

The present invention provides a conservation tillage tool including a main frame and a rear frame pivotally attached thereto disposed to support a number of soil working implements in sequence. The main frame is supported by a ground wheel unit which is movable with respect to the main frame to move the latter and its rear frame between a raised transport position and a number of lowered working positions. A tongue assembly including a hitch attached to a tractor supports the front of the frame assembly by a pivotal connection therewith. A mechanism for maintaining the frame assembly level at all times of working or transport positions includes a mechanism pivotally interconnecting the tongue, the frame assembly and the movable ground wheel unit.

The working implements may comprise a pair of disc gangs mounted on the front of the main frame and vertically adjustable relative to the main frame, and a plurality of deep-tillage shanks mounted on the main frame rearwardly of the front disc gangs. Rearwardly of the deep tillage shanks, a pair of disc gangs may be independently mounted on the rear frame also for adjustability relative to the main frame. The front and rear disc gangs are mechanically interconnected by spring cushioned linkage for uniform operating depth control by simultaneous raising and lowering of both gangs, and independent suspension linkage is provided for the rear frame to act in concert with the linkage for allowing the rear discs to follow ground contours not only independent of the front disc gangs but relative to each other.

An object of this invention is the provision of an improved conservation tillage tool.

Another object of this invention is the provision of a conservation tillage tool that effectively cuts through and mixes crop residue with the soil, that penetrates the soil to shatter a hardpan, and that levels and covers uneven soil with a uniform texture of soil and residue.

Yet another object of this invention is the dual utilization of linkage for mechanically interconnecting the front and rear disc gangs for simultaneous on-the-go depth control movement relative to the main frame, and for enabling the rear disc gangs to follow the ground contours independently of the front disc gangs.

Still another object of this invention is the dual utilization of linkage for mechanically interconnecting the front and rear disc gangs for simultaneous depth control movement relative to the main frame, and for enabling the two sets of rear disc gangs to follow the ground contours relative to each other.

It is another object of this invention to provide a conservation tillage tool that effectively controls the amount of remaining residue to meet conservation compliance program criteria and minimize spring tillage.

BRIEF DESCRIPTION OF THE DRAWINGS

These and other attributes of the invention will become more clear upon making a thorough review and study of the following description of a preferred embodiment, particularly when reviewed in conjunction with the drawings, wherein:

FIG. 5 is a side elevational view similar to FIG. 1, and showing the frame in a lowered position and with all implements in working positions;

FIG. 9 is a vertical view of the rear subframe as taken along the line 9—9 in FIG. 5;

FIG. 10 is an enlarged sectional view as taken along the line 10—10 in FIG. 5;

FIG. 11 is an enlarged side elevational view showing the rear subframe and rear disc gangs in a first working position, certain parts broken away for clarity of illustration; and FIG. 12 is a side elevational view similar to FIG. 11, and showing the rear subframe and rear disc gangs in a raised working position, certain parts broken away for clarity of illustration.

BEST MODE FOR CARRYING OUT THE INVENTION

Figure 1:
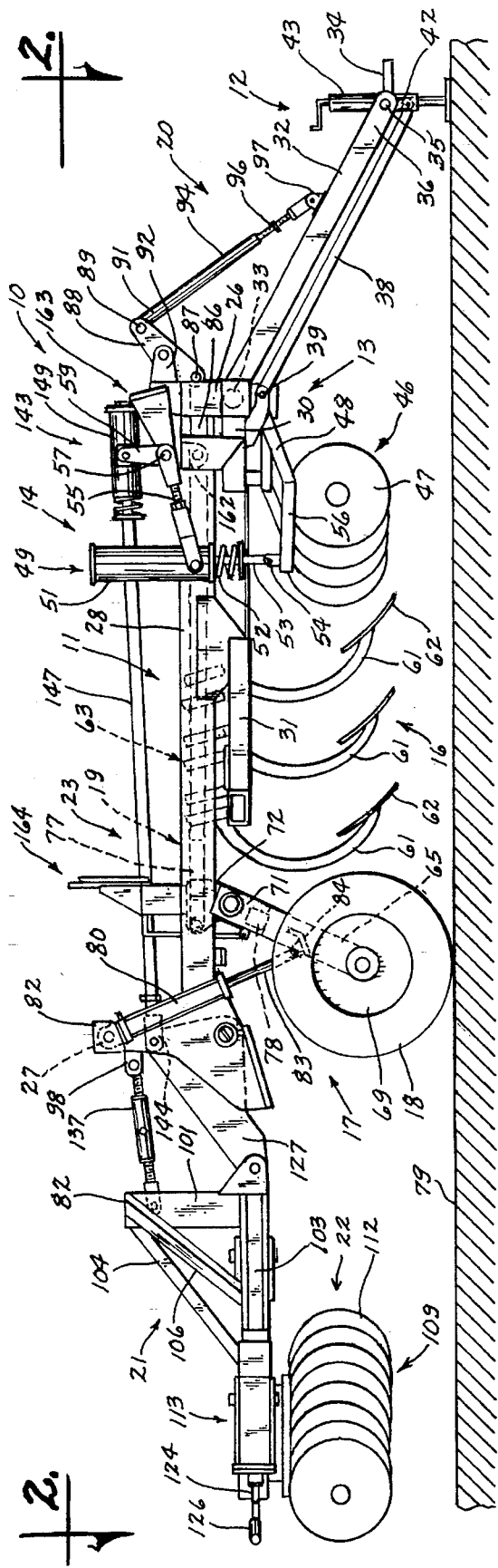
FIG. 1 is a side elevational view of the conservation tillage tool of the present invention showing the frame and all working implements in transport position.
Figure 2:
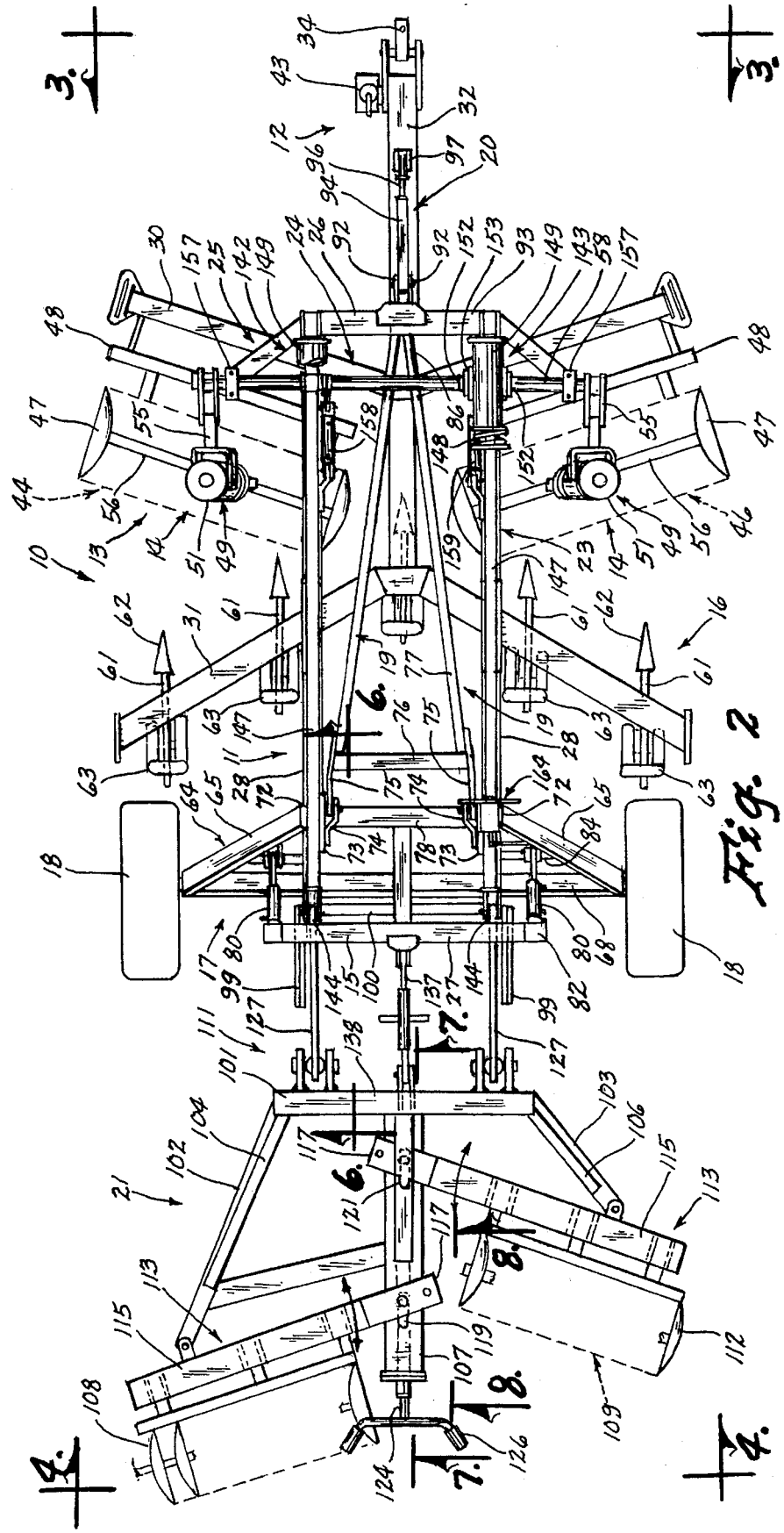
FIG. 2 is a top plan view of the conservation tillage tool of this invention as taken along the line 2—2 in FIG. 1.

Referring now to the drawings wherein like reference numerals designate identical or corresponding parts through the several views, FIGS. 1 and 2 show the conservation tillage tool (10) of the present invention.

The tool (10) comprises generally a main frame assembly (11), a tongue assembly (12), a front disc assembly (13), a front disc spring assembly (14), a deep-tillage shank assembly (16), an axle assembly (17), including a pair of ground wheels (18), a push tube assembly (19) and a pull tube assembly (20) which with the axle assembly (17) make up the frame leveling mechanism, a rear frame assembly (21), a rear disc assembly (22), a rear disc spring assembly (23) and a rockshaft assembly (24).

The main frame assembly (11) comprises basically a rectangular frame (25) having a front end (26), a rear end (27), and a pair of side members (28) interconnecting the front and rear ends (26), (27). An additional pair of side members may be utilized, placed outwardly and side-by-side with members (28) if desired. A forward sweeping wing beam (30) (FIG. 2) is mounted on the front end (26) of the frame (25), and a rear sweeping wing beam (31) (FIG. 2) is secured to the frame (25) intermediate its ends. A transverse brace (15) extends across the rear end (27).

Figure 3:
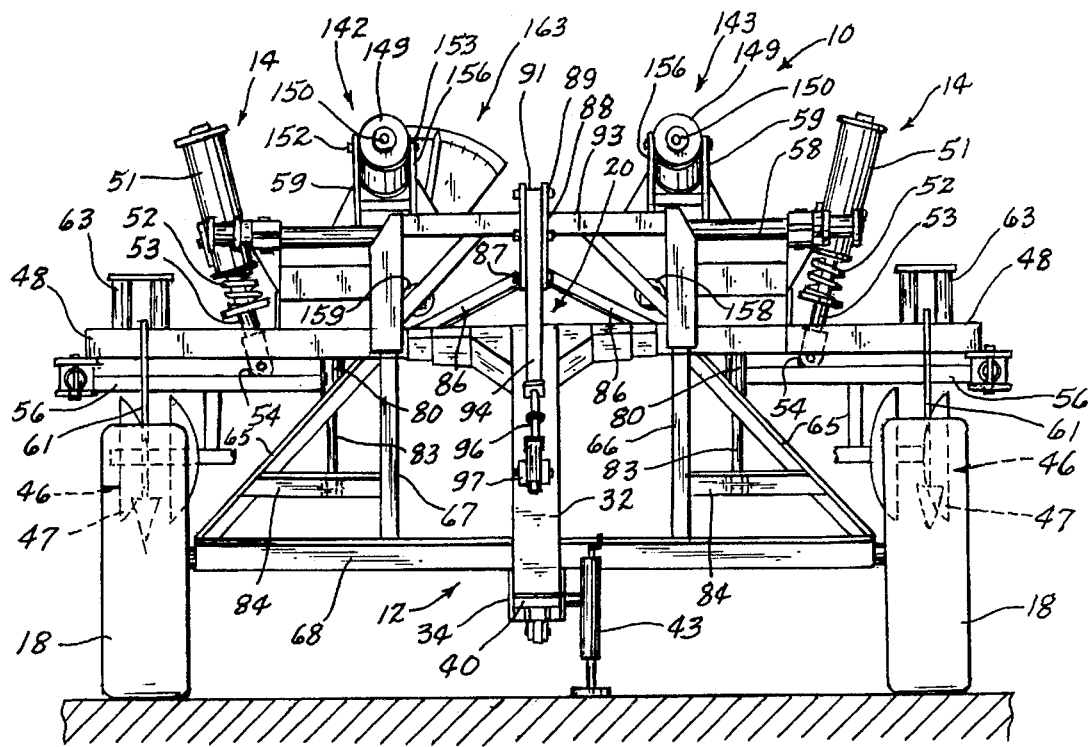
FIG. 3 is a front elevational view thereof as taken along the line 3—3 in FIG. 2.
Figure 4:
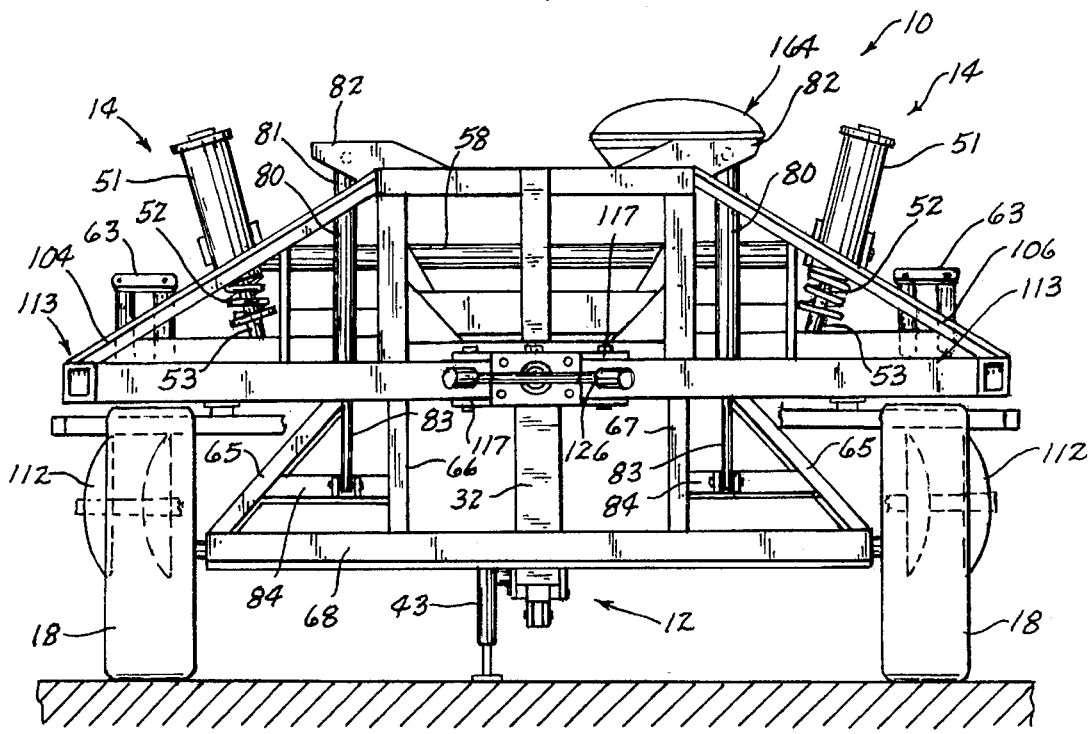
FIG. 4 is a rear elevational view as taken along the line 4—4 in FIG. 4.

The tongue assembly (12) comprises basically an elongated, T-shaped tongue (32) (FIG. 3) pivotally connected at its rear end at (33) to the front end (26) and having a hitch (34) pivotally connected at (35) to its forward end (36). To maintain the hitch (34) in a normally horizontal condition at all times for connection to the drawbar (40) (FIG. 3) of a tractor or other prime mover, a hitch bar (38) is pivotally connected at one end to the frame front end (26) at (39), below the tongue connection (33), and is pivotally connected at its opposite, forward end at (41) to an ear (42) depending from the hitch (34). A conventional screw jack (43) may be used to support the forward end of the tongue (32) when the implement (10) is not in use.

The front disc assembly (13) includes left and right disc gangs (44), (46) (FIG. 2), each may use standard 24-inch diameter blades (47) mounted on either 11 or 15-inch centers by conventional structure including a pair of weldments (48) (FIG. 1), for pivotally receiving each disc gang (44), (46), the weldment (48) secured in laterally spaced relation to the forward wing beam (30). Although not a part of this invention, each front disc gang (44), (46) may be adjusted relative to the wing beam (30) and the direction of travel from 20° to 14°, and structure is provided for ensuring the gangs (44), (46) do not contact each other in the center as a result of adjustment.

To provide for both down pressure and flexing action of the front disc gangs (44), (46), including lift simultaneously with the rear disc assembly (22), the front disc spring assembly (14) includes a spring unit (49) (FIG. 11) for each disc gang (44), (46). Each spring unit includes generally an outside canister (51) housing a spring (52) and an inside canister (not shown) longitudinally movably mounted within the outside canister (51) and including a strap (53) pivotally connected to an ear (54) on a mounting bar (56) part of each front disc gang mounting. Each outside canister (51) is pivotally connected to a universal joint unit (55) in turn pivotally mounted to an outer end (57) (FIG. 11) of a transverse rockshaft (58), the latter connected to and extended through midportions of a pair of rocker arms (59) (FIGS. 11 and 12) which are part of the rockshaft assembly (24) utilized for lifting the front and rear disc assemblies (13) and (22).

Referring to FIGS. 1, 2 and 5, the shank assembly (16) is standard in that either 4, 5 or 7 shanks (61) with subsoilers (62) are pivotally mounted at their upper ends by structure to the wing beam (31), with each shank (61) provided with an extension spring unit (63) for providing a trip pressure adjustable up to 4600#. A simple adjustment (not shown) provides for working depths of 8 to 18 inches.

Figure 6:
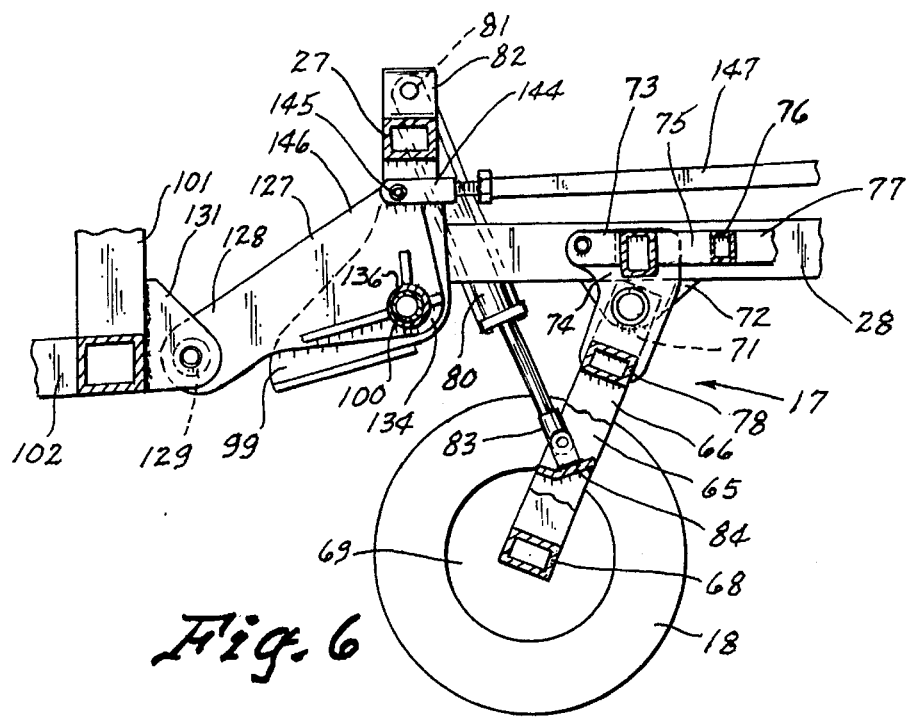
FIG. 6 is an enlarged detail view as taken alone the line 6—6 in FIG. 2.

The axle assembly (17) (FIGS. 2, 5 and 6) includes a U-shaped weldment (64) with a pair of laterally spaced uprights (66), (67) and a transverse beam (68) at their base for retaining at each end wheel hub units (69) for mounting the ground wheels (18). Braces (65) are secured between each outer end of the beam (68) and an upper portion of each upright (66), (67). A U-shaped structure (71) (FIG. 6) is provided at the upper end of each upright (66), (67) for receiving and pivotally connecting depending flanges (72) (FIG. 1) from each frame side member (28). An inside element (73) of each structure (71) (FIG. 2) coacts with a projection (74) welded thereto to form a socket for pivotal connection to a rear projection (75), the rear projections (75) secured as by welding to the rear end (76) of a V-shaped weldment (77) of the push tube assembly (19). A cross brace (78) (FIG. 2) is secured between the uprights upper ends.

To raise and lower the main frame assembly (11) and the rear frame assembly (21) relative to the ground level (79) (FIGS. 1 and 5), a pair of identical hydraulic cylinder units (80) are pivotally connected each at one end (81) to a raised inverted U-shaped portion (82) of the main frame assembly (11) mounted at the rear end (27) thereof, and at a lower end (83) to a brace (84) secured to the axle weldment (64). The units (80) are hydraulically connected to work in unison. As denoted hereinbefore, the axle assembly (17) also acts in concert with the push tube assembly (19) and the pull tube assembly (20) to form a leveling mechanism for ensuring that the main frame (26) stays level at all times, regardless of its raised or lowered position relative to the ground level (77).

The push tube assembly (19) includes primarily the previously described push tube weldment (77), the forward end (86) (FIG. 1) of which is pivotally connected at (87) to the lower end of a rock arm (88), the upper end of which is pivotally connected at (89) to the rear end (91) of the pull tube assembly (20). Intermediate its ends, the rock arm (88) is pivotally connected to and disposed between a pair of projections (92) secured to a raised cross beam (93) (FIG. 3) on the frame front end (26). The pull tube assembly (20) includes generally an elongated tube (94) (FIGS. 1 and 5) with an adjustable shaft unit (96) pivotally connected to ears (97) formed on the tongue (32). Thus, vertical movement of the axle assembly (17) effects like forward or rearward movement of both the push tube and pull tube assemblies (19), (20) interconnected with the frame assembly (11), applying a force at the pivotal connection (33) (FIG. 1) of the tongue (32) to the frame front end (26) to maintain the frame (25) level.

Prior to discussing the rear frame assembly (21), it should be noted that the rear end (27) of the main frame (25), in addition to supporting the inverted U-shaped portion (82), includes a projection (98) (FIGS. 11 and 12) extended rearwardly from the upper central portion (82), and a pair of triangular shaped, laterally spaced plates (99) (FIGS. 2 and 6), a transverse shaft (100) (FIG. 6) secured to and spacing apart the plates (99).

The rear frame assembly (21) (FIGS. 1, 2, 4, 11 and 12) includes an upright, rectangular weldment (101) (FIG. 11) with outwardly, horizontally extended wings (102), (103) of different length, and which wings are braced at (104), (106), with a rearwardly extended tube unit (107) for adjusting the angles of cut of both rear disc gangs (108), (109), and with a forwardly extended main frame connecting unit (111). Each rear disc gang (108), (109) is identical, each again may use standard 24-inch diameter blades (112) mounted on either 11 or 15-inch centers by conventional mounting structure (113) on each side to the rear, subframe assembly (21). Each mounting structure (113) is pivotally secured, each at an outer end to a rear end (115) of a respective wing (102), (103) (FIG. 2) and at an inner yoke-shaped end (117) pivotally and adjustably to the tube unit (107).

Figure 7:
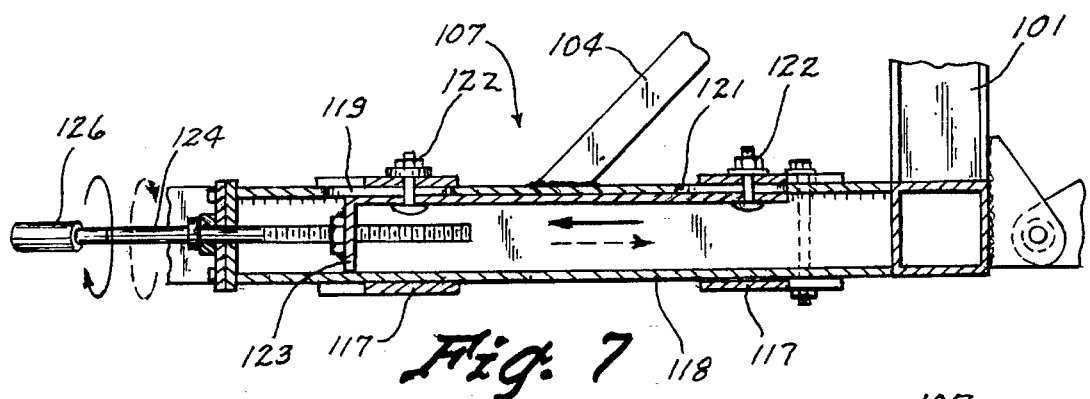
FIG. 7 is an enlarged vertical sectional view as taken along the line 7—7 in FIG. 2.
Figure 8:
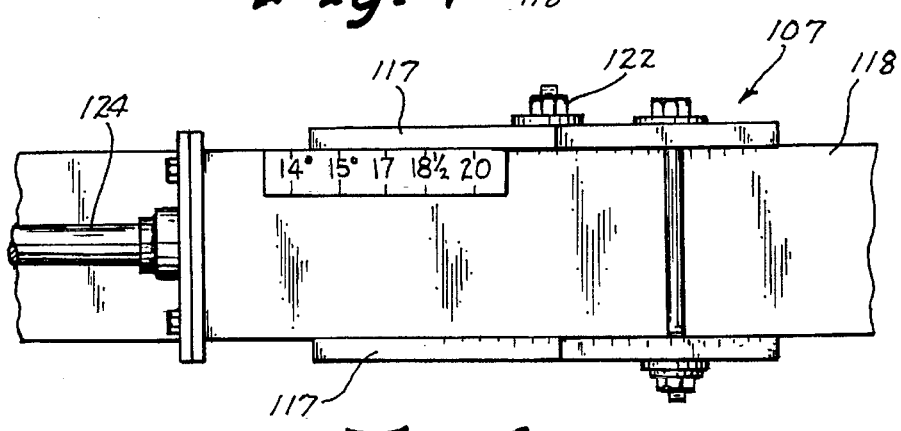
FIG. 8 is a side elevational, fragmentary view as taken along the line 8—8 in FIG. 2.

Referring to FIGS. 7 and 8, the tube unit (107) is seen as including a hollow tube (118) with a pair of elongated slots (119), (121) formed therein, each for receiving a fastener (122) for attaching each inner end (117) of a disc gang mounting (113) with a weldment (123) slidably mounted within the tube (118) and longitudinally controlled by a jack screw, hand-operated unit (124). Thus, rotation of the handle (126) effects longitudinal movement of the weldment (123) and both disc gang mounting ends (117) a like amount to pivot them within a horizontal plane about their outer pivotally mounted ends (115) a like amount and degree. Similar to the front disc gangs, (44), (46), this arrangement provides unlimited cutting angle settings between 14° and 20° (FIG. 8).

The main frame connecting unit (111) includes a pair of laterally spaced, triangular flanges (127) each having a rear lower corner (128) pivotally connected at (129) (FIG. 10) to ears (131), (132) secured to the forward face (133) (FIG. 6) of the weldment (101), and with a front lower corner (134) having a reinforced bushing (136) secured to its inner side for rotational mounting on the transverse shaft (100) at the main frame rear end (27). By this arrangement, each flange (127) is located on the inside of and closely adjacent a plate (99) at the rear of the main frame (25). An adjustable link unit (137) is secured between rear end projection (98) and an upper central portion (138) (FIG. 2) of the weldment (101) for maintaining the rear disc gangs (108), (109) level during their operation. To provide for the rear frame weldment (101) and the entire rear disc assembly to tilt within a vertical plane, thereby permitting raising of one disc gang (108), for example, above the other (109), each pivotal connection (129) includes a flexible connection in the form of a ball joint (139) (FIG. 10) welded within the rear lower corner (128) of each flange (127). Each ball joint (139) is interconnected within its flange between the rear frame weldment ears (131), (132) by a link pin (141) such that the entire weldment (101) may tilt within a vertical plane about one ball joint (139) as shown in FIG. 9, the tilting resulting in the pivotal raising of one flange (127a) relative to the other flange (127b), the effect of which is described hereinafter.

To provide for mechanically interconnecting both front and rear disc gang assemblies (13) and (22) so as to raise and lower them simultaneously for uniform depth control, and to provide at the same time for the rear disc gang assembly (22) to be raised, due to uneven terrain, independently of the front disc gang assembly (13), the rear disc spring assembly (23) and the rockshaft assembly (24) are provided. The former assembly (23) comprises a pair of spring-cushion units (142), (143) (FIGS. 1, 2, 11 and 12) each interconnected between the rear frame connecting unit (111) and the front rockshaft (58). As each unit (142), (143) is identical, only one will be described, it including a yoke (144) (FIG. 6) at the rear for pivotal connection at (145) to an upper corner (146) of a flange (127), an elongated tubular link (147) adjustably connected to the yoke (144) and integral with a conventional tubular slide unit (not shown) slidably engaged within a compression spring (148) in turn slidably mounted within a canister (149), and with a capscrew (150) at the forward end of the tubular link (147) inserted into the canister (149). Each canister (149) is provided with side mounts for pivotal connection at (151) to the upper ends (152), (153) (FIG. 3) of a pair of laterally spaced, interconnected rock arms (59), (156). Two pair of the rocker arms (59), (156) are provided in laterally spaced positions on the transverse rockshaft (58), each pair to pivotally receive a canister (149). To rotate the rockshaft (58), mounted to the frame front end (26) by a pair of bearing units (157) (FIG. 2), a pair of hydraulic cylinder units (158), (159) (FIG. 2) are provided, each mounted on the inside of a frame side member (28), and with one end, the piston end (161) (FIG. 11) for example, pivotally connected to a lower end (162) of one, (59) for example, of each pair of rock arms (59), (156). The units (158), (159) are hydraulically connected to work in unison.

Thus, upon simultaneous actuation of the two cylinder units (158), (159), rotation of the one rock arm (59) of each interconnected pair (59), (156), will effect rotation of both the rockshaft (58) and movement, forward or rearward, of both canisters (149). Movement of the canisters (149) will effect like pivotal movement of the rear frame flanges (127), thus effecting a lifting or lowering of the remainder of the rear frame assembly (21) and the rear disc gangs (108), (109). Simultaneously, and with the same direction and amount of movement, lifting or lowering, rotation of the rockshaft (58) effects movement of the spring units (49) via their outer canisters (51) and like movement of both right and left front disc gangs (44), (46).

The lift mechanism thus far described also provides for independent raising action of the rear disc gangs (108), (109) relative to the front disc gangs (44), (46) due to the capability of the spring cushion units (142), (143) to compress a predetermined amount, thus permitting the pivotal lifting to a certain amount of the rear frame flanges (127) about their main frame pivots (136) and concomitant movement of the lift links (147). This action provides for the rear disc gangs (108), (109) to follow ground contours independently of the front disc gangs (44), (46). It should be noted that each unit (142), (143) is set such that upon operation of the hydraulic units (158), (159), the units (142), (143) effect a simultaneous and synchronized raising or lowering of both the front and rear disc assemblies (13) and (22), respectively.

Further, with each spring cushion unit (142), (143) operable independently of the other as to the predetermined amount of longitudinal movement of each lift link (147), should the ground contour raise one rear disc gang relative to the other, as described hereinbefore, the resulting pivotal raising of one flange (127a) (FIG. 9) relative to the other (127b) non-raised flange can occur due to the capability of the spring cushion unit (142) or (143) connected therewith permitting a compressed longitudinal movement of the specific link (147) involved, without effecting rotation of the front disc gang rockshaft (58), and permitting the other spring cushion unit (142) or (143) to remain unchanged.

Working depth indicator units (163) and (164) (FIGS. 1 and 3) are mounted by conventional structure on the frame (25) for visually indicating the respective depths of the front and rear disc gangs (44), (46) and (108), (109), and of the deep-till shanks (61).

Thus, it is seen that all of the objectives described hereinbefore have been attained by the structure described herein.

I claim:

1. In a tillage tool having a frame with a front and a rear, ground wheel means attached to and disposed to support said frame above a ground level, means for moving said ground wheel means relative to said frame to move said frame between a raised position and a lowered position, tongue means having one end pivotally connected to the front of said frame and having an opposite forward end adapted to be connected to a prime move, leveling means for maintaining said frame in a substantially level position as said frame is moved between said positions, a subframe pivotally movably attached to the rear end of said frame and carried thereby, a first implement mounted on the front of said frame for vertical movement relative thereto, a second implement mounted on said frame intermediate said front and rear, and a third implement mounted on said subframe, the invention comprising:

linkage means operably attached to and interconnecting said first implement and said third implement;

hydraulic means operably attached to said linkage means for controlling said linkage means for simultaneously raising or lowering said first and third implements;

first means interposed in said linkage means for permitting said third implement to move vertically relative to said first implement; and said linkage means including second means pivotally connecting said subframe to said main frame rear for permitting said subframe to tilt about a horizontal axis and within a vertical plane;

and further wherein said linkage means includes a pair of elongated links mounted longitudinally of said frame, in parallel with each other, and each link inserted through said first means;

said first means including a pair of laterally spaced canisters operably connected to said hydraulic means, and a spring connected to each said link and compressible within a respective said canister upon movement of each said link forwardly of said frame, whereby said third implement may raise independently of said first implement;

and with said second means including a pair of flanges arranged in parallel relationship to each other, and each flange pivotally connected to said subframe and one of said links.

2. The tillage tool as defined in claim 1, and further wherein said pivotal connection of said each said flange with said subframe including a balljoint whereby said subframe is tiltable within a vertical plane.

3. In a tillage tool having a frame with a front and a rear, ground wheel means attached to and disposed to support said frame above a ground level, means for moving said ground wheel means relative to said frame to move said frame between a raised position and a lowered position, tongue means having one end pivotally connected to the front of said frame and having an opposite forward end adapted to be connected to a prime mover, leveling means for maintaining said frame in a substantially level position as said frame is moved between said positions, a subframe pivotally movably attached to the rear end of said frame and carried thereby, a first implement mounted on the front of said frame for vertical movement relative thereto, a second implement mounted on said frame intermediate said front and rear, and a third implement mounted on said subframe, the invention comprising:

linkage means operably attached to and interconnecting said first implement and said second implement;

hydraulic means operably attached to said linkage means for controlling said linkage means for simultaneously raising or lowering said first and second implements;

first means interposed in said linkage means for permitting said second implement to move vertically relative to said first implement;

second means pivotally connecting said subframe to said main frame rear for permitting said subframe to tilt about a horizontal axis and within a vertical plane;

and further wherein said linkage means includes a pair of elongated links mounted longitudinally of said frame, in parallel with each other, and each link inserted through said first means.

4. The tillage tool as defined in claim 3, and with said first means including a pair of laterally spaced canisters operably connected to said hydraulic means, and a spring connected to each said link and compressible within a respective said canister upon movement of each said link forwardly of said frame, whereby said third implement may raise independently of said first implement.

5. In a tillage tool having a frame with a front and a read, ground wheel means attached to and disposed to support said frame above a ground level, means for moving said ground wheel means relative to said frame to move said frame between a raised position and a lowered position, tongue means having one end pivotally connected to the from of said frame and having an opposite forward end adapted to be connected to a prime mover, leveling means for maintaining said frame in a substantially level position as said frame is moved between said positions, a subframe pivotally movably attached to the rear end of said frame and carried thereby, a first implement mounted on the front of said frame for vertical movement relative thereto, a second implement mounted on said frame intermediate said front and rear, and a third implement mounted on said subframe, the invention comprising:

linkage means operably attached to and interconnecting said first implement and said second implement;

hydraulic means operably attached to said linkage means for controlling said linkage means for simultaneously raising or lowering said first and second implements;

first means interposed in said linkage means for permitting said second implement to move vertically relative to said first implement;

second means pivotally connecting said subframe to said main frame rear for permitting said subframe to tilt about a horizontal axis and within a vertical plane;

and further including rockshaft means pivotally connected between said first means and said hydraulic means.

6. The tillage tool as defined in claim 5, further including spring means for connecting said rockshaft means to said first implement.

7. The tillage tool as defined in claim 5, and with said first means including a pair of laterally spaced canisters operably connected to said hydraulic means, and a spring connected to each said link and compressible within a respective said canister upon movement of each said link forwardly of said frame, whereby said third implement may raise independently of said first implement.

8. The tillage tool as defined in claim 7, and further wherein said rockstaft means includes a transverse rockshaft rotatably mounted on said frame and having a pair of rocker arms secured thereto, each said rocker arm pivotally connected to one of said canisters.

* * * * *